Aug. 25, 1964 R. E. BENN ETAL 3,146,425

DATA STORAGE DEVICE

Filed July 20, 1960 4 Sheets-Sheet 1

INVENTORS.
ROBERT E. BENN
DOUGLAS C. WENDELL, JR.
BY William E. Cleaver
ATTORNEY Aug. 25, 1964 R. E. BENN ETAL 3,146,425

DATA STORAGE DEVICE

Filed July 20, 1960 4 Sheets-Sheet 2

INVENTORS.
ROBERT E. BENN
DOUGLAS C. WENDELL, JR
BY William E. Cleaver
ATTORNEY

Aug. 25, 1964 R. E. BENN ETAL 3,146,425

DATA STORAGE DEVICE

Filed July 20, 1960 4 Sheets-Sheet 3

*INVENTORS.*
ROBERT E. BENN
DOUGLAS C. WENDELL, JR
*BY* William E. Cleaver
ATTORNEY INVENTORS.
ROBERT E. BENN
DOUGLAS C. WENDELL, JR.
BY William E. Cleaver
ATTORNEY United States Patent Office 3,146,425

Patented Aug. 25, 1964

3,146,425

DATA STORAGE DEVICE

Robert E. Benn, Broomall, and Douglas C. Wendell, Jr., Malvern, Pa., assignors to Burroughs Corporation, Detroit, Mich., a corporation of Michigan Filed July 20, 1960, Ser. No. 44,222

10 Claims. (Cl. 340—173)

This invention relates to data storage devices and more particularly to electrostatic data storage devices.

In data processing systems it is necessary to provide data storage means (commonly called memory devices) into which the information, or data, being handled can be stored and from which such data can be retrieved when it is to be further processed. There are many well-known forms of data storage devices such as electron tubes, electrostatic storage tubes, mercury delay lines, magnetic tapes, magnetic drums, magnetic core matrices, etc. Many of these systems are considered and described in the Proceedings of the Institute of Radio Engineers, October 1953.

The present invention relates to a data storage system wherein a dielectric recording medium is employed to enable the data to be stored and retrieved according to electrostatic principles. In certain data processing applications the present invention provides advantages not found in the other data storage systems mentioned above.

It is an object of the present invention to provide an improved data storage device.

It is a further object of the present invention to provide a data storage system which provides a relatively large output signal.

It is a further object of the present invention to provide a data storage device which provides a large signal-to-noise ratio as well as a data read-out operation which is extremely fast.

It is a further object of the present invention to provide an electrostatic data storage device which requires only a relatively small number of components.

In accordance with a feature of the present invention there is provided a dielectric medium having first and second sides upon which there are respectively deposited discrete first and second elements of electrical conducting material, for instance, in one embodiment, aluminum discs. The elements are essentially arranged in rows and columns. There is further provided a plurality of electrodes each of which is spaced a selected distance from a different assigned one of each of said first elements. When a sufficient difference of potential (which is accomplished by applying proper signals to said second electrical conducting elements and to said electrodes) is developed between any first element and its assigned electrode, there results an electrical discharge which provides a transfer of electrons (and in one embodiment gaseous positive ions) from the electrode to its first element. As a result of the transfer of electrons, there results a negative charge on the first element and a positive charge on the second element. Throughout the description to follow the primary consideration will be given to the electrostatic charge on the first element, which can be defined as either binary ONE or binary ZERO.

In accordance with another feature, a detecting means is connected to either all of the column connections of the second elements or separately to each column connection of the second elements. After a charge has been stored, as described in the last feature, a read-out operation enables the detecting means to determine (by detecting a current surge to or from said second elements) if in fact there is an electrostatic charge on a first element.

In accordance with another feature of the present invention there is provided a coincidence selection means to enable fractional signals (defined as either read signals or write signals) to be simultaneously and/or independently applied to each electrode and its associated second electrical conducting element. Accordingly when selected fractional signals are simultaneously present, an electrical discharge occurs between an electrode and its assigned first element only if the element has not been previously charged, and when these selected fractional signals are independently present there is no effect insofar as destroying or adding a charge to any of the first elements. In a second embodiment when other fractional signals are simultaneously present an electrical discharge occurs only if the first element had been previously charged.

The foregoing and other objects and features of this invention will be best understood by reference to the following description of an embodiment of the invention taken in conjunction with the accompanying drawings, wherein.

Figures 1, 2:
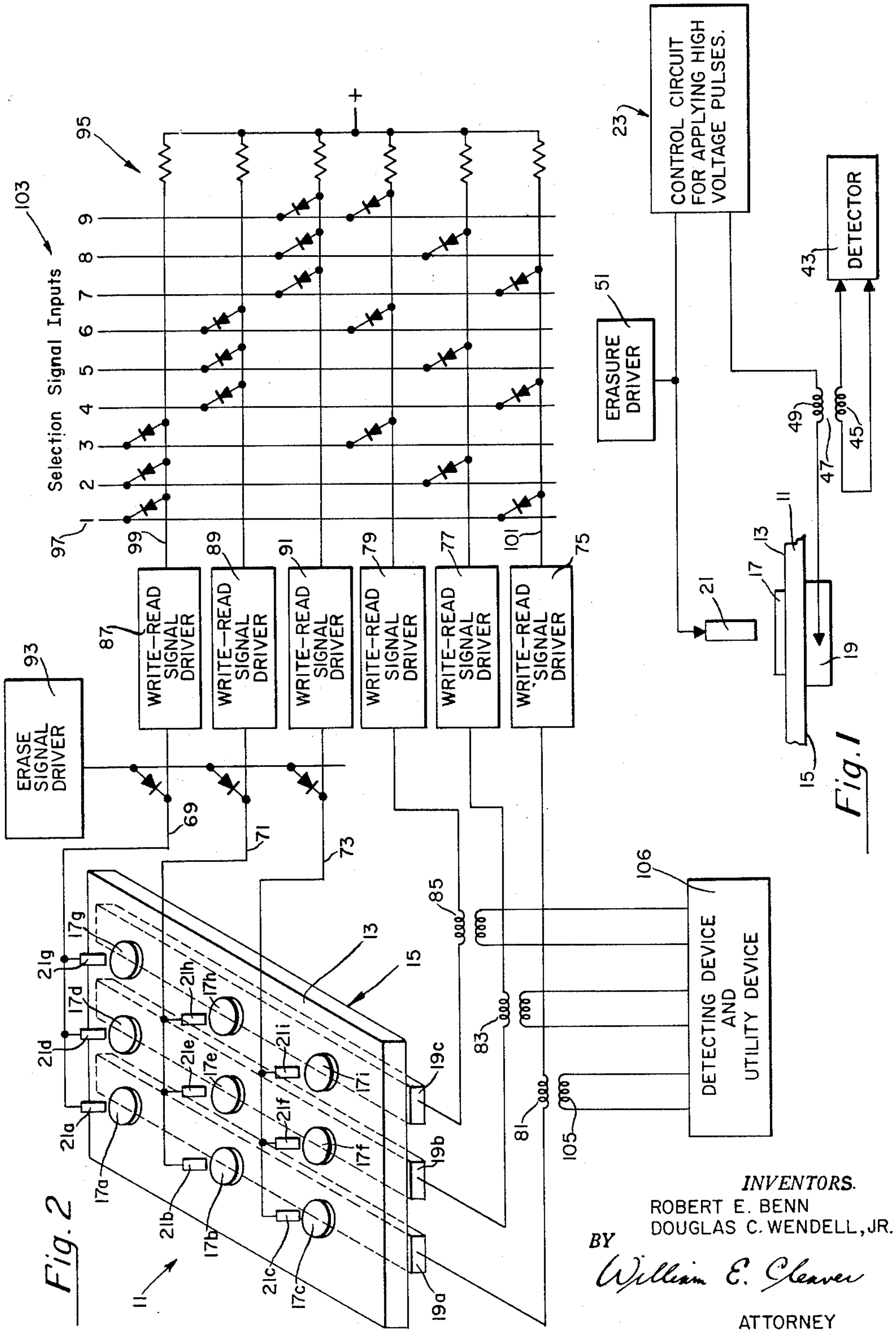
FIG. 1 is a block schematic of an embodiment of the invention depicting singular elements.
FIG. 2 is a combined pictorial and block schematic diagram of a first embodiment of the present invention.

The present invention operates in accordance with the principle that an electrical discharge can be effected through a gaseous medium between two terminals if a sufficient difference of potential is existing between said two terminals. Such a discharge may be accompanied by a luminous phenomenon (spark discharge), or may be invisible. Throughout the discussion to follow a spark or disruptive discharge will be considered in the ordinary sense as a visible discharge between two electrodes, although such a definition of a spark is somewhat dissimilar in the strict technical sense from the definition given in the text "Fundamental Processes of Electrical Discharge in Gases," by Leonard B. Loeb, published in 1939 by John Wiley & Sons, N.Y. In the above text a detailed description of the Townsend effect and of the natural laws related to an electrical discharge is found.

For purposes of understanding the present invention we need only consider that when the disruptive discharge takes place there is an abundance of free electrons (and positive ions) present in the gaseous medium between the two electrodes. The free electrons will be attracted to the electrode having the positive potential applied thereto. If this positive potential electrode has a dielectric medium between it and the free electrons, then the travel of the free electrons to the positive potential electrode will be interrupted as the electrons impinge the dielectric medium. In the embodiment which utilizes positive ions to provide an electrostatic charge, the positive ions are attracted to the electrode with the negative charge thereon. In summary then, if an electrode is disposed adjacent a dielectric medium, and a second electrode is disposed a selected distance from the other side of this dielectric medium, an electrostatic charge can be developed on the sides of the dielectric medium by applying a difference of potential between the two electrodes which will be sufficient to cause an electrical discharge therebetween. This principle has been used in the electrostatic printing art as taught by U.S. Patent 2,919,170 issued to Herman Epstein and assigned to Burroughs Corporation.

We have found, however, that when the electrons come to rest on the dielectric medium some of them tend to spread away from the point at which they impinged the dielectric surface. When the electrostatic charge is to be erased or destroyed, for instance by sparking or providing a disruptive discharge in the reverse direction, we have noted that only that portion of the electrons under the electrodes, or lying substantially in the area of the original impinging, is removed. When cycles of charging and charge erasing taking place, as is necessary with an electrostatic data storage system, we have found that the electrons which spread from the impinged area build up sufficiently to result in spurious signals or to eventually prevent a subsequent charging operation.

In order to overcome the problems resulting from this last-described spreading of charges, the present invention provides discrete electrical conducting areas, or elements, to which the electrons are attracted. With such a novel arrangement we have found that very few electrons stray from the impinged area (now the electrical conducting element) which in turn mitigates the problem of spurious signals, etc.

Since there is a minimum difference of potential which must exist before a discharge will take place between two electrodes the present invention also offers a high signal-to-noise ratio. For instance, in the text "Fundamental Processes of Electrical Discharge in Gases," mentioned above, it is stated that "A spark will not pass below about 275 v. in air, no matter what the conditions." Therefore by simultaneously applying two signals between two electrodes (under proper conditions) each having an amplitude of 200 v., and each having opposite polarities, there would result a discharge. However, neither of the 200 v. signals if applied independently would effect an electrical discharge. Since the half signals or fractional signals when applied independently would fail to even partially provide a discharge the noise level from half signals is virtually non-existent, which is a distinct advantage when compared with magnetic core coincident memory systems.

After an element has been charged (thereby storing either a binary ONE or a binary ZERO) its electrostatic charge condition can be detected by either (1) attempting to charge the element again or (2) reversing the polarities of the write signals, to cause a disruptive discharge in the reverse direction. If the element has an electrostatic charge thereon and there is an attempt to charge it again, such an attempt will be in vain (as will be explained more fully hereinafter). The unsuccessful attempt to charge the element can be detected by the absence of a surge of current, which surge accompanies a successful attempt. Obviously if method (2) is used the electrostatic charge will be detected by a surge of current which accompanies the reverse disruptive discharge.

For a more detailed explanation of the present invention, consider the figures.

In FIG. 1 there is shown a dielectric medium 11 having a first surface 13 and a second surface 15. Upon the first surface 13 there is deposited an element 17 of electrical conducting material. The first element 17 is disc shaped in a preferred embodiment but such a disc shape is not necessary to the operation; other shapes may be used. As described above, in the present invention, the electrical conducting element 17 has been provided so that when an electrical discharge occurs the free electrons will come to rest on the electrical conducting element 17 and substantially remain in one spot rather than stray into areas away from where the impingement of the electrons took place. In this way there is assurance that when there is an erasure of the charge by an operation to be described hereinafter, electrons are more likely to be completely removed, thereby greatly reducing the opportunity for spurious signals to be spawned.

On the second surface 15 of the dielectric medium 11 there is deposited a second electrical conducting element 19 sometimes referred to as an anvil. As will be apparent hereinafter when there is a plurality of second electrical conducting elements, these elements are combined to form a common connection. Disposed a selected distance from the first element 17 is found an electrode 21. Coupled to the electrode 21 and to the anvil or second electrical conducting element 19 is control circuitry 23.

When a binary ONE is to be stored by the device of FIG. 1, a negative voltage pulse is applied to the pin 21 and a positive voltage pulse is applied to the anvil 19 to cause an electrical discharge between the pin 21 and the disc 17. Two such pulses are shown in FIGS. 4A*a* and 4A*b*. By way of example the pulses in FIG. 4A are shown having voltage values which would be necessary to provide proper operation of the system of FIG. 1 when the air gap between the pin 21 and the disc 17 is in the order of 3 mils. The positive pulse 25 has an amplitude of +500 v. which is applied to anvil 19, while the negative pulse 27 has an amplitude of −500 v. which is applied to pin 21.

In FIG. 4A*c* the graphic representation depicts the voltage pattern that exists when the pulses 25 and 27 are simultaneously applied. The dashed line 29, which represents +750 v., indicates the minimum voltage difference, between the pin 21 and the disc 17, which must be attained in order to effect a disruptive discharge.

When the pulses 25 and 27 are applied, the potential difference between the pin 21 and the disc 17 rises to approximately 1000 v. as shown by voltage level 31. Since 1000 v. is higher (in a positive voltage sense) than the required +750 v. nedeed for a disruptive discharge, there results a spark between the pin 21 and the disc 17. As a result of the discharge there are free electrons which are attracted to the disc 17 and the potential difference, as shown in FIG. 4A*c*, commences to decrease finally settling at a potential difference of +500 v. as shown by point 33.

Actually during the pulse period of the pulses 25 and 27, there are a number of disruptive discharges or sparks, but the net effect is that of a relatively large single discharge and for purposes of understanding this invention, it is fitting to consider the phenomena as a single discharge.

At the termination of the pulses 25 and 27 the difference of potential looking from the pin 21 to the disc 17 becomes −500 v. as shown by voltage level 35. By definition voltage level 35 will be considered a stored binary ONE although it could be defined as a stored binary ZERO. FIG. 4A*d* shows the difference of potential between the disc and the anvil which is 500 v. and represents a stored binary ONE.

In accordance with the discussion thus far electrons have come to rest on disc 17 providing an electrostatic charge between the disc 17 and the anvil 19 and thereby representing a stored binary ONE. The system of FIG. 1 must now be able to detect the presence of the stored binary ONE in order to retrieve this information. A read cycle is therefore commenced and the plus read pulse 37 in FIG. 4A*a* is applied to anvil 19 while the negative read pulse 39 in FIG. 4A*b* is appiled to the pin 21. The read pulses 37 and 39 are transmitted from the control circuitry 23 in response to a command signal, for instance, a programming step signal (not shown).

Since the potential at the disc 17 with repect to the pin 21 is −500 v. as shown in FIG. 4A*c* at the time that the two read pulses 37 and 39 are applied, the resultant difference of potential during "read time" rises (in a voltage sense) to +500 v. as shown by voltage level 41. The +500 v. difference of potential is not greater than the minimum +750 v. difference of potential (dashed line 29) necessary to initiate a disruptive discharge. Since there is a stored binary ONE present, the simultaneous application of the read pulses 37 and 39 does not result in a disruptive discharge between the pin 21 and the disc 17. At the termination of the read pulses 37 and 39 the difference of potential between the pin 21 and the disc 17 returns to −500 v. as shown in FIG. 4A*c*.

In FIG. 1 there is shown a detector device 43. The detector device 43 may be any electronic device, such as a transistor amplifier, which will respond to a difference of potential developed across the winding 45. In addition to the amplifier the detector 43 may include a lamp, a paper tape or card punching mechanism, a printing mechanism, or some other means to permanently and/or visibly record information.

The winding 45 in FIG. 1 is the secondary winding of transformer 47 which transformer has a primary winding 49. Primary winding 49 is series-connected in the input line to the anvil 19. If there is a surge of current through the input line to or from the anvil 19 in response to electrons either being removed or deposited on the disc 17, an induced voltage will be developed across the secondary winding 45. Since the electrons will be deposited or removed in accordance with a disruptive discharge, as described earlier, it becomes evident that the detecting device 43 can detect when there has been a spark discharge in either direction between the pin 21 and the disc 17. In FIG. 1 the primary winding is shown series connected to the anvil but it is to be clearly understood that the primary winding could be series connected to the pin 21, or some other form of coupling such as a resistor network might be used.

Hence when the read pulses 37 and 39 are applied respectively to the anvil 19 and the pin 21, and there is no spark discharge, the absence of said spark can be determined by detector 43. In a normal operation any one of a number of well-known programming arrangements could be employed to apply the two read pulses 37 and 39, while at the same time indicating to the system that there was an information read-out being effected. Such programming arrangements are not fundamental to the present invention and are therefore not shown. If at such program read-out time the detector device 43 indicated no disruptive discharge in response to pulses 37 and 39, such absence of a discharge would be interpreted as being indicative of a stored binary ONE.

Carrying the analysis of the system further, it is clear that if there had not been a stored binary ONE, or had not been an electrostatic charge between the disc 17 and the anvil 19, the simultaneous presence of the read pulses 37 and 39 would have caused a disruptive discharge as did the pulses 25 and 27. The induced voltage on winding 45 resulting from this last-mentioned discharge during read-out time would indicate that there had been a binary ZERO stored. Obviously the electrostatic charge condition could be defined differently from the above with the charged condition being a binary ZERO and the uncharged condition being a binary ONE in which case a resultant induced voltage on winding 45 during read-out time would effect the retrieval of a stored binary ONE bit of information instead of a binary ZERO.

After a read-out operation has taken place each of the elements is electrostatically charged since, (1) the elements representing stored ONES prior to the read out operation had electrons stored thereon and this charged condition was not disturbed by the application of the read-out pulses and, (2) the elements which had not been electrostatically charged prior to read-out became electrostatically charged during read-out. In order to effect a subsequent write-read cycle the charges on each of the elements must be destroyed or erased. In other words, in keeping with the definition that voltage level 35 in FIG. 4A*c* represents a binary ONE, each of the elements must be returned to a stored binary ZERO condition before the next write-read operation. To accomplish this erasure operation there is provided an erasure driver 51. The erasure driver 51 can be any pulse generator means such as a transistor or electron tube amplifier which will provide a positive voltage pulse to the pin 21. The erasure driver 51 may also be controlled by some programming arrangement not shown.

Figure 4:
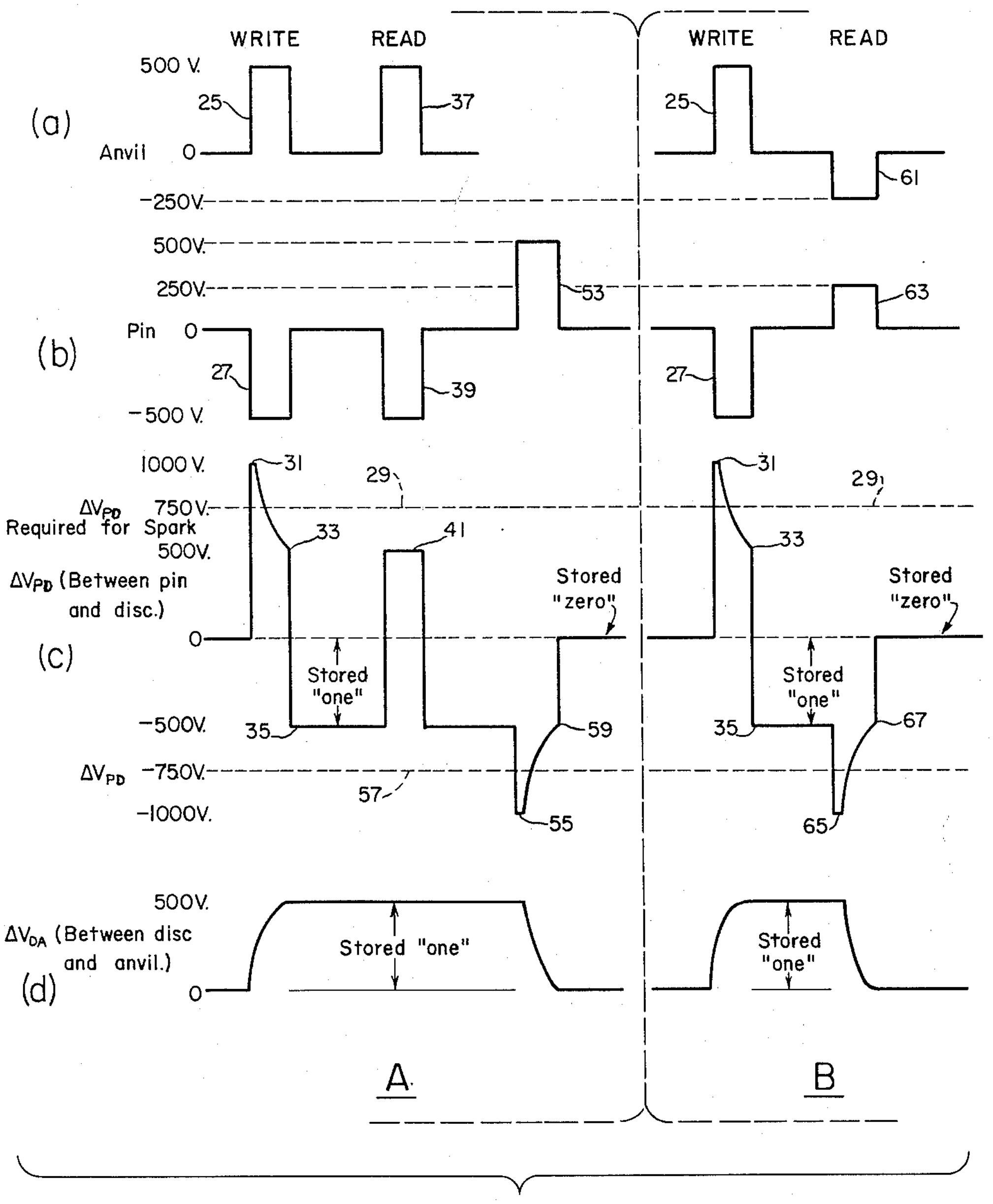
FIG. 4A is a graphic display of the voltage patterns at significant points in the system shown in FIG. 2.
FIG. 4B is a graphic representation of the voltage patterns at various significant points of the system shown in FIG. 3.

When the erasure pulse 53 in FIG. 4 is applied to pin 21, the difference of potential between the pin 21 and disc 17 decreases in a voltage sense to −1000 v. as indicated by voltage level 55. Since −1000 v. is greater in a negative voltage sense than the −750 v. minimum needed for a disruptive discharge, as represented by dashed line 57, there will result a disruptive discharge between the disc 17 and the pin 21. As a result of the discharge, electrons will pass to the pin 21 and the difference of potential between the pin and the disc will increase in a voltage sense toward point 59. At the termination of the erasure pulse 53, the difference of potential between the pin 21 and the disc 17 will become ZERO. With the difference of potential being at ZERO the system is ready for another write-read cycle as described above.

Figure 3:
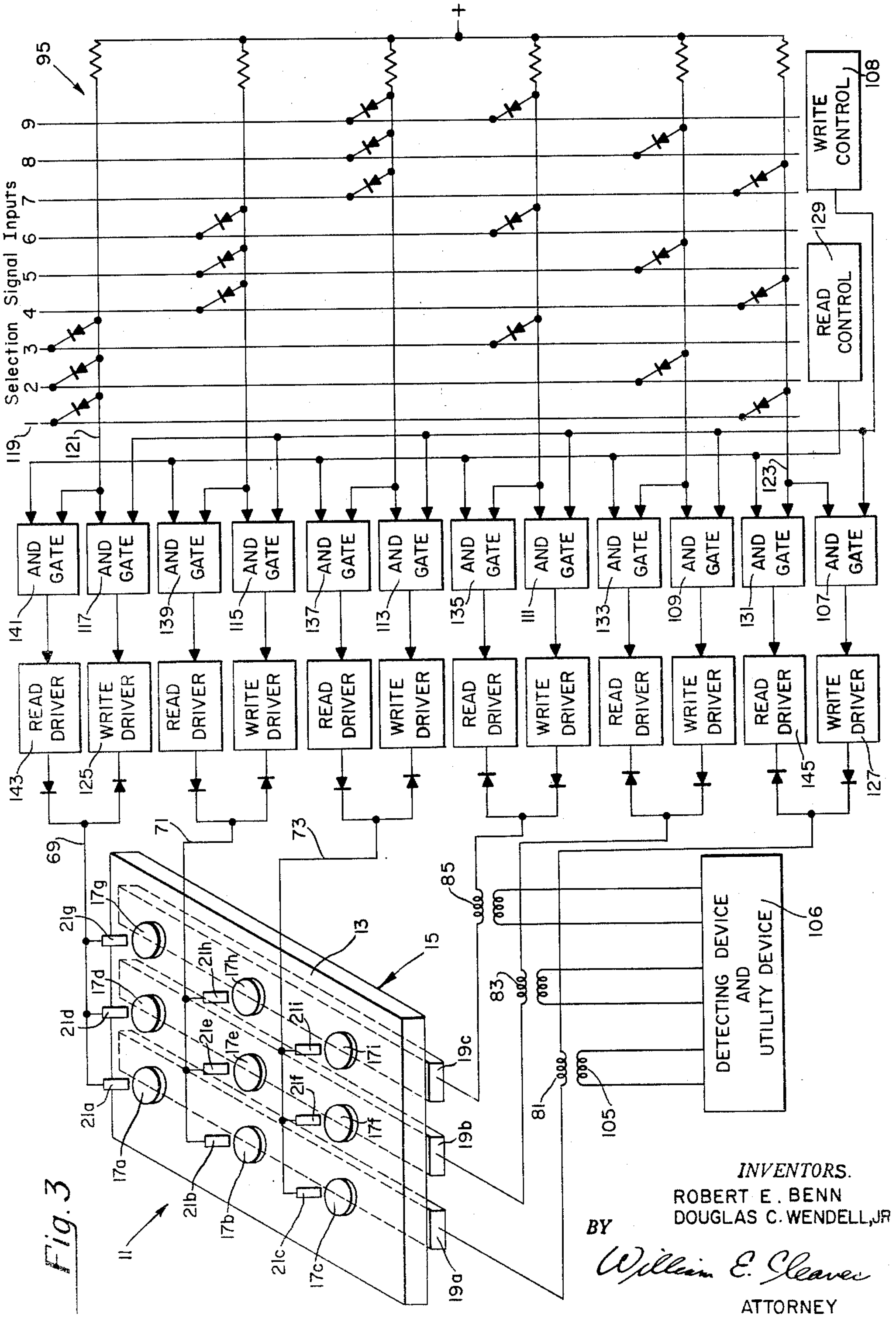
FIG. 3 is a diagram similar to FIG. 2 showing a second embodiment of the present invention.

In a second embodiment of the invention shown by FIG. 3, the read operation is effected differently from that previously discussed. The voltage pattern for "read" shown in FIG. 4B represents the read operation for the FIG. 3 embodiment. However, at this point, consider FIG. 1 and FIG. 4B and assume again that an electrostatic charge has been established between the disc 17 and the anvil 19 representing a stored binary ONE as depicted by voltage level 35, FIG. 4B. In this second read operation there is a negative read pulse 61 transmitted to the anvil 19 and a positive read pulse 63 transmitted to the pin 21. With the simultaneous application of the pulses 61 an 63 the difference of potentail decreases in a negative voltage sense to −1000 v. as shown by voltage level 65. Since −1000 v. is greater in a negative sense than the minimum voltage (−750 v.) necessary for a disruptive discharge, a spark occurs between the disc and the pin.

The spark discharge results in the difference of potential shifting from −1000 v. to −500 v. as shown by voltage level point 67. When the read pulses 61 and 63 are removed the difference of potential decreases to 0 volts. In FIG. 4B the electrostatic charge between the anvil 19 and the disc 17 is shown as a stored ONE.

It becomes evident in connection with the second embodiment that when a read operation is accomplished there is simultaneously therewith an erasing operation, and as a result each of the elements is returned to a stored binary ZERO condition, ready for the next write-read cycle. When comparing the voltage patterns of FIG. 4B with the voltage patterns of FIG. 4A, it can be seen that in effecting the latter write-read-erase cycle there is required one additional pulse time. However, as will become apparent below in order to accomplish the operation represented by FIG. 4B, more equipment is required than is necessary to accomplish the operation represented by FIG. 4A.

Considering in more detail the two embodiments of the present invention, mentioned above, examine first FIG. 2 which shows a dielectric medium 11 having a first surface 13 and a second surface 15. On the first surface 13 there are deposited nine electrical conducting elements **17*a* through 17*i* in the form of metal discs. The nine discs are arranged in a matrix having three rows and three columns. Also in FIG. 2 are nine electrodes 21*a* through 21*i*. The electrodes or pins are common connected according to rows by the respective row connectors 69, 71 and 73. On the second surface 15 three bar-type electrodes 19*a*, 19*b* and 19*c*** are shown lying in column positions corresponding to the columns of the disc matrix previously described.

Connected to each bar electrode is an associated pulse generator or signal driver 75, 77 and 79. Each of these write-read signal drivers is connected to its associated bar electrode through an associated primary winding 81, 83 and 85. In a similar manner three other pulse generators or write-read signal drivers 87, 89 and 91 are connected respectively to the three disc rows through the row connections 69, 71 and 73. An erase signal driver 93 is connected as shown in FIG. 2 to the row connections 69, 71 and 73.

A diode matrix 95 is coupled to the system for the purpose of selecting a pair of write-read signal drivers. After a pair of these last-mentioned signal drivers has been selected, two signals such as the write signals 25 and 27, depicted in FIG. 4A, are respectively applied to the proper anvil and pin electrodes. To illustrate the above operation assume that a binary ONE is to be stored in the position where the first disc row crosses the first disc column which is represented by disc 17*a*. In order to effect such a storage the position No. 1 terminal 97 has a negative signal applied thereto. In response to the negative signal being applied to the position No. 1 terminal 97, each of the driver control lines 99 and 101 becomes negative which, tin turn, biases drivers 87 and 75 into an "on" condition. The two drivers 87 and 75 respectively transmit pulses such as those shown by 27 and 25 of FIG. 4A. After pulses 27 and 25 have been transmitted, the remaining steps for storing a binary ONE, by an electrostatic charge between disc 17*a* and electrode 19*a*, are identical with the storage operation described in connection with FIG. 1 and FIG. 4A above. During the read-out operation of the system each of the position terminals 103 is selected sequentially, although a parallel read-out operation could just as easily be accomplished if such were desired. After the read-out pulses have been transmitted and the stored binary ONE is detected by an induced voltage across the secondary winding 105, each of the discs in the matrix is "erased" by a positive signal transmitted from the erase signal driver 93. It is to be clearly understood at this point that other types of signal devices other than the diode matrix 95 can be used. For instance, a bank of relays, a coincidence magnetic core matrix, telephone switching equipment, etc., might well be used. Also as mentioned earlier, the pulse polarities may be reversed provided the system is arranged to operate in conjunction with this reversal.

In considering a storage system of the type in FIG. 2, it should be understood that when the write-pulse 27 is applied to line 69 there is no effect on the discs 17*d* and 17*g* which would cause a current surge to respectively pass through the primary windings 83 and 85 to thereby induce a false output signal in their respective secondary windings. Similarly when a read pulse 39 is applied to line 69 there is no effect on discs 17*d* and 17*g* which would result in a current surge passing through the primary windings 83 and 85. Herein the present invention offers an advantage with regard to signal-to-noise ratio when compared with other coincidence signal-type storage systems. For instance, in a coincidence signal magnetic core type storage system, if the discs 17*d* and 17*g* were considered as each being a magnetizable core, these cores would be partially magnetized as a result of signals 27 and 25 being applied to line 69. The cumulative change of flux from all the partially magnetized cores would give rise to signals on the output line and therefore the intelligence in such a system must be at some signal level substantially above the noise level to be recognized and extracted for further use. In the present invention there is virtually no noise level hence the signal resulting from a spark discharge has a good signal-to-noise ratio. Further, the absolute amplitude value of the output or read signal in the present invention is high compared to other systems, for instance, the amplitude of such a signal is in the order of 50 volts. This value can be compared with the output signal range of 5 to 100 millivolts, which is developed in a normal magnetic core storage device. As a result of the strong output signal the degree of amplification needed for further use of the output signal is reduced.

Once the combined write pulses have added to a value greater than the threshold, for instance 750 v. (in the previously described circuit) the spark time or discharge times is in the order of 1 nanosecond. Hence the readout of information can be obtained in 1 nanosecond.

In a magnetic core arrangement a core is switched from its negative remanent state to its positive remanent state (or vice versa) to effect a readout. By comparison such switching takes at least one-half of a microsecond. Hence the present invention provides an extremely fast readout of information which is an obvious improvement.

Consider now FIG. 3 which is a second embodiment of the present invention. The system of the second embodiment employs the signals shown in FIG. 4B, to store and retrieve information. The identification numerals in FIG. 3, wherever possible, are the same as those used in FIG. 2. In order to examine the operation of the system shown in FIG. 3 assume again that a binary ONE is to be stored at disc 17*a*. The first operation is a write operation, and in accordance therewith the write control signal generator 108 transmits a relatively long negative voltage gate signal to the AND gates (odd numbered) 107 through 117. These AND gates respond to two negative input signals and can be designed according to the negative AND gates described in the text "Pulse and Digital Circuits," by Drs. Millman and Taub, published by McGraw-Hill, New York, in 1956. During the write-control gate signal the position No. 1 terminal 119 is subjected to a negative pulse which renders driver lines 121 and 123 negative. The provision of a negative signal on the lines 121 and 123 causes the negative AND gates 117 and 107 to be responsive which, in turn, causes the write signal drivers 125 and 127 to transmit write pulses such as pulse 27 and 25 of FIG. 4B. An ensuing spark discharge between pin 21*a* and disc 17*a* and an electrostatic charge between disc 17*a* and electrode 19*a* are effected in a manner identical with that described for FIG. 2. After the binary ONE has been stored and this information is to be retrieved, the read control signal generator 129 is turned on which provides a relatively long negative voltage gate signal to the AND gates (odd numbered) 131 through 141. Again the position No. 1 terminal 119 receives a negative pulse which causes the driver lines 121 and 123 to go negative. The negative signals respectively, on lines 121 and 123, operate in conjunction with the read control signal from the read control driver 129 to render the AND gates 141 and 131 responsive, which in turn trigger the read signal drivers 143 and 145. The read signal drivers 143 and 145 respectively transmit read signals, such as the read signal 63 and 61, to pin 21*a* and bar electrode 19*a*. This simultaneous presence of signals 63 and 61 provides a disruptive discharge in the reverse direction. The current surge through the primary winding 81, which accompanies the disruptive discharge, as explained above with regard to FIG. 1, induces a voltage in the second winding 105 thereby enabling the detector 106 to verify that a binary ONE had been stored.

The read pulses 61 and 63 when added together do not exceed the disruptive discharge threshold as is evident in FIG. 4B. Therefore the discs which did not have a binary ONE stored thereon will remain at stored binary ZERO, and the discs which had stored a binary ONE will be returned to a stored binary ZERO condition. As a result of the read out the entire set of discs is ready for a new write-read cycle. It is evident from the above description that the operation of the system shown in FIG. 3 requires one less pulse time than does the system shown in FIG. 2. In effect, the read operation of the system shown in FIG. 3 is also an erase operation thereby saving the erase pulse time which is necessary in the operation of the system of FIG. 2. However, it is also evident from the above description that since the polarity of the read signal and the write signal used in the FIG. 3 embodiment are different, one from the other, and in addition the read signal has half the amplitude of the write signal, it is necessary to provide twice as many signal drivers than was required in the system of FIG. 2. Further, in FIG. 3 there is an AND gate required fo reach driver, as shown.

In summary, the two embodiments of FIGS. 2 and 3 indicate that the price which is paid for the shorter write-read-erase cycle is an increase in components. The present invention provides a means for storing and retrieving binary information and has at least three distinct advantages, namely, a good signal-to-noise ratio, a high speed read-out and an output signal with a large absolute amplitude.

Figure 5:
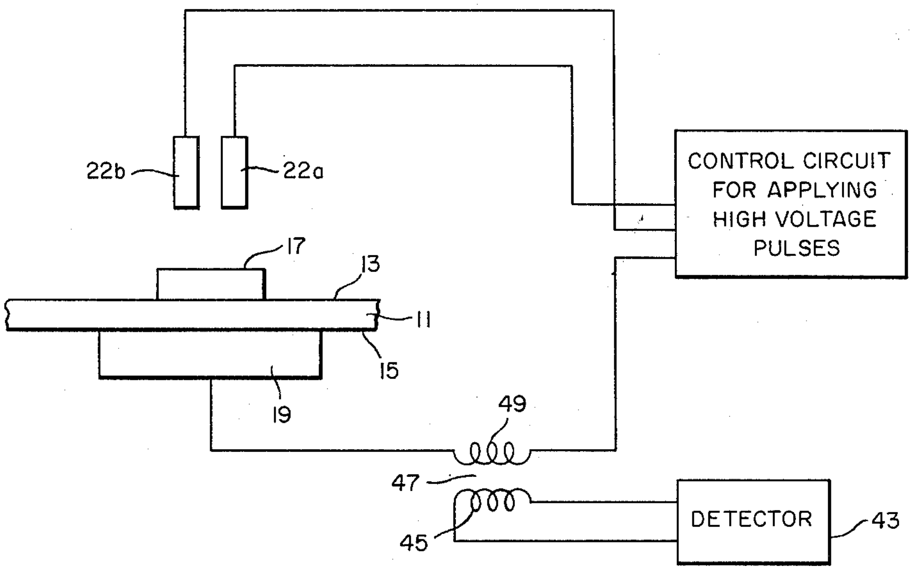
FIG. 5 is a schematic view of an additional embodiment characterized by a different electrode arrangement.

FIGURE 5 shows another embodiment of the present invention which differs from the embodiment shown in FIGURE 1 in particular, with respect to the electrode device. In FIGURE 5 the electrode is composed of two elements, a steady state electrode 22*a* and an initiating electrode 22*b*. The initiating electrode 22*b* receives a pulse having the same polarity as the anvil 19. As can be seen in FIGURE 5, the initiating electrode 22*b* is disposed a discrete distance from the steady state electrode 22*a* but this distance is far shorter than the gap between electrode 22*a* and the disc 17. When the information is to be stored, a write pulse of negative polarity is applied to steady state electrode 22*a* and a second write pulse, for instance, of positive polarity, is applied to the anvil 19. The amplitude of each of these last mentioned signals is such that when simultaneously applied they will maintain but not necessarily initiate an electrical discharge between electrode 22*a* and disc 17. Simultaneously with the application of the write pulses to electrode 22*a* and anvil 19, there is a write pulse applied to initiating electrode 22*b*. This last mentioned write pulse has the same polarity (in this instance positive), as does the write signal applied to anvil 19. However, since the distance between the electrode 22*a* and 22*b* is sufficiently short, the write pulse applied to electrode 22*b* is of a substantially smaller amplitude than the signal applied to the anvil 19. In response to the relatively small positive signal applied to the electrode 22*b*, there is an initiating discharge occurring between the electrode 22*a* and the electrode 22*b*. Once this discharge has commenced, the free electrons are attracted to the disc 17 and the discharge is maintained between the steady state electrode 22*a* and the disc 17 even though the write signal applied to electrode 22*b* is terminated.

With this embodiment it is possible to store positive ions on the disc 17 by simply reversing all the polarities just described. In other words if a negative signal is applied to anvil 19 and to initiating electrode 22*b* and a positive signal is applied to electrode 22*a*, there would follow an electrical discharge between electrode 22*b* and electrode 22*a* and the positive gaseous ions would be attracted to the disc 17. A detailed description of this phenomenon is taught in U.S. Patent application No. 729,847, filed April 21, 1958, in the name of Robert Benn et al., and assigned to Burroughs Corporation.

Other various electrode arrangements might well be used in connection with the present invention; for instance, an electrode version wherein the initiating electrode is disposed coaxial with the steady state electrode might well be used with a system in a manner similar to that described for FIGURE 5.

Figure 6:
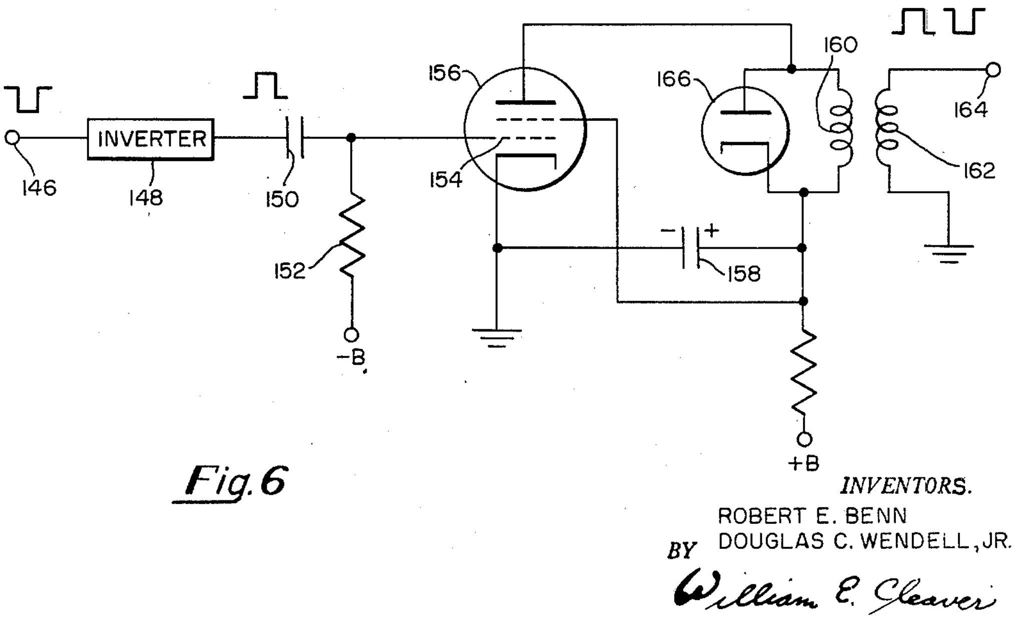
FIG. 6 is a schematic view of a pulse driver circuit.

In FIGURE 6 there is shown an example of a signal driver circuit which might be used as a write driver, a read driver, or an erase signal driver. Many other signal driver devices might be used such as those described in the text "Pulse and Digital Circuits" by Drs. Millman and Taub, mentioned above. In FIGURE 6 a negative signal is applied to terminal 146, which signal is transmitted to inverter 148. The positive signal from inverter 148 is transmitted to the condenser 150 whereat in conjunction with the resistor 152 the positive signal is differentiated. The differentiated signal applied to the grid 154 causes the tetrode 156 to conduct. When tetrode 156 conducts, it enables the condenser 158 (which has been previously charged when the tetrode 156 was not conducting) to discharge therethrough, thereby providing a voltage across and current flow through the primary winding 160. In accordance with transformer action, a voltage is induced across the secondary winding 162 in accordance with the current flow through the primary winding 160. Depending on how the secondary winding 162 is arranged, the output signal at terminal 164 may be either positive or negative and of any desirable amplitude, thereby enabling the arrangement of FIGURE 6 to be used as a write, read, or erase driver. The diode 166 serves as a short circuit means to prevent ringing when the tetrode 156 terminates its conduction.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. An electrostatic data storage device comprising: a dielectric medium having first and second surfaces lying opposite each other; first discrete electrical conducting means disposed adjacent to said first surface of said dielectric medium and having an outer surface lying away from said first surface; second discrete electrical conducting means disposed adjacent to said second surface of said dielectric medium and lying opposite said first discrete electrical conducting means; an electrode means disposed a selected distance from said outer surface of said first discrete electrical conducting means; first signal generating means coupled to said electrode means to provide a first signal thereto; second signal generating means coupled to said second discrete electrical conducting means to provide a second signal thereto; said first signal and said second signal each respectively having such polarity and such amplitude as to maintain an electrical discharge between said electrode and said first discrete electrical conducting means in response to having both said first signal and said second signal simultaneously present; signal detecting means coupled to said second discrete electrical conducting means to detect an occurrence of said electrical discharge.

2. An electrostatic data storage device comprising: a dielectric medium having first and second surfaces lying opposite each other; a plurality of first discrete electrical conducting means disposed adjacent to said first surface of said dielectric medium, each of said conducting means having an outer surface lying away from said first surface; a plurality of second discrete electrical conducting means disposed adjacent said second surface and each of which lies opposite a predetermined number of assigned different ones of said first discrete electrical conducting means; a plurality of electrode means each of which is assigned to a different one of said first electrical conducting means and each of which is disposed a selected distance from said outer surface of its assigned first electrical conducting means; a plurality of first signal generating means each of which is coupled to a predetermined number of different ones of said electrode means to selectively provide a first signal thereto; a plurality of second signal generating means each of which is coupled to a predetermined number of different ones of said second discrete electrical conducting means to selectively provide a second signal thereto; and said first signal and said second signal each having such polarity and such amplitude as to maintain an electrical discharge between any particular electrode means and its assigned first discrete electrical conducting means in response to having both said first signal and said second signal respectively simultaneously present at said particular electrode means and at the one of said second discrete electrical conducting means which lies opposite said last-mentioned first discrete electrical conducting means.

3. An electrostatic data storage device comprising: a dielectric medium having first and second surfaces lying opposite each other; a plurality of first discrete electrical conducting means disposed adjacent to said first surface, each of said conducting means having an outer surface lying away from said first surface; a plurality of second discrete electrical conducting means disposed adjacent said second surface and each of which lies opposite a predetermined number of assigned different ones of said first discrete electrical conducting means; a plurality of electrodes each of which is assigned to a different one of said first discrete electrical conducting means, and each of which is disposed a selected distance from said outer surface of its assigned first discrete electrical conducting means; a plurality of first signal generating means each of which is coupled to a predetermined number of different ones of said electrodes to selectively provide a first signal thereto; a plurality of second signal generating means each of which is coupled to a predetermined number of different ones of said second discrete electrical conducting means to selectively provide a second signal thereto; and said first signal and said second signal each having such polarity and such amplitude as to cause an electrical discharge between any particular electrode and its assigned first discrete electrical conducting means in response to having both said first signal and said second signal respectively simultaneously present at said particular electrode and at the one of said second discrete electrical conducting means which lies opposite said last-mentioned first discrete electrical conducting means.

4. An electrostatic data storage device comprising: a dielectric medium having first and second surfaces lying opposite each other; a plurality of first discrete electrical conducting means disposed adjacent to said first surface and arranged in rows and columns, each of said first discrete conducting means having an outer surface lying away from said first surface; a plurality of second preformed electrical conducting means disposed adjacent said second surface, said second discrete electrical conducting means being adapted to provide common connecting means along column positions which correspond to the columns formed by said first discrete electrical conducting means; a plurality of electrodes each of which is assigned to a different one of said first discrete electrical conducting means and each of which is disposed a discrete distance from said outer surface of its assigned first electrical conducting means; a plurality of first signal generating means each of whose output means is coupled to a different row of said electrodes to selectively provide a first signal thereto; a plurality of second signal generating means each of which is coupled to a different one of said column common connecting means to selectively provide a second signal thereto; and said first signal and said second signal each having such polarity and such amplitude as to cause an electrical discharge to pass between any particular electrode and its assigned first discrete electrical conducting means only in response to having both said first signal and said second signal respectively, simultaneously present at said particular electrode and at the one of said second discrete electrical conducting means which lies in the column corresponding to the column in which said particular electrode lies.

5. An electrostatic data storage device comprising: a dielectric medium having first and second surfaces lying opposite each other; a plurality of first discrete electrical conducting means disposed adjacent to said first surface and arranged in rows and columns, each of said first conducing means having an outer surface lying away from said first surface; a plurality of second discrete electrical conducting means disposed adjacent said second surface, said second discrete electrical conducting means being adapted to provide common connecting means along column positions which correspond to the columns formed by said first discrete electrical conducting means; a plurality of electrodes each of which is assigned to a different one of said first discrete electrical conducting means and each of which is disposed a selected distance from said outer surface of its assigned first electrical conducting means; a plurality of first signal generating means each of whose output means is coupled to a different row of said electrodes to selectively provide a first signal thereof; a plurality of second signal generating means each of which is coupled to a different one of said column common connecting means to selectively provide a second signal thereto; said first signal and said second signal each having such polarity and such amplitude as to cause an electrical discharge to pass between any particular electrode and its assigned first discrete electrical conducting means only in response to having both said first signal and said second signal respectively, simultaneously present at said particular electrode and at the one of said second discrete electrical conducting means which lies in the column corresponding to the column in which said particular electrode lies; and signal detecting means coupled to each of said second signal generating means to detect an occurrence of an electrical discharge.

6. An electrostatic data storage device according to claim 5 wherein said signal detecting means are inductively coupled to each of said second signal generating means.

7. An electrostatic data storage device comprising: a dielectric medium having first and second surfaces lying opposite each other; a plurality of first discrete electrical conducting means disposed adjacent to said first surface, and arranged in rows and columns; each of said first discrete electrical conducting means having an outer surface lying away from said first surface; a plurality of second discrete electrical conducting means disposed adjacent said second surface, said second discrete electrical conducting means being adapted to provide common connecting means along column positions which correspond to said columns formed by said first discrete electrical conducting means; a plurality of electrodes each of which is assigned to a different one of said first electrical conducting means and each of which is disposed a selected distance from said outer surface of its assigned first electrical conducting means; a plurality of first signal generating means each of whose output means is coupled to a different row of said electrodes to selectively provide a first signal thereto; a plurality of second signal generating means each of which is coupled to a different one of said column common connecting means to selectively provide a second signal thereto; said first signal and said second signal each having such polarity and such amplitude as to cause an electrical discharge to pass between any particular electrode and its assigned first discrete electrical conducting means only in response to having both said first signal and said second signal respectively, simultaneously present at said particular electrode and at the one of said second discrete electrical conducting means which lies in the column corresponding to the column in which the assigned said particular electrode lies; and an erasure signal generator means coupled to the output means of each of said first signal generating means to provide an erasure signal to said electrodes in response to which any electrostatic charge on any of said first electrical conducting means is removed.

8. An electrostatic data storage device comprising: a dielectric medium having first and second surfaces lying opposite each other; a plurality of first discrete electrical conducting means disposed adjacent to said first surface and arranged in rows and columns, each of said first conducting means having an outer surface lying away from said first surface; a plurality of second discrete electrical conducting means disposed adjacent said second surface, said second discrete electrical conducting means being adapted to provide common connecting means along column positions which correspond to said columns formed by said first discrete electrical conducting means; a plurality of electrodes each of which is assigned to a different one of said first electrical conducting means and each of which is disposed a selected distance from said outer surface of its assigned first electrical conducting means; a plurality of first signal generating means each of whose output means is coupled to a different row of said electrodes to selectively provide a first signal thereto; a plurality of second signal generating means each of which is coupled to a different one of said column common connecting means to selectively provide a second signal thereto; said first signal and said second signal each having such polarity and such amplitude as to cause an electrical discharge to pass between any particular electrode and its assigned first discrete electrical conducting means only in response to having both said first signal and said second signal respectively, simultaneously present at said particular electrode and at the one of said second discrete electrical conducting means which lies in the column corresponding to the column in which said particular electrode lies; and signal detecting means coupled to each of said second signal generating means to detect the occurrence of said electrical discharge; and an erasure signal generator means coupled to the output means of each of said first signal generating means to provide an erasure signal to said electrodes in response to which any electrostatic charge on any of said first electrical conducting means is removed.

9. An electrostatic data storage device comprising: a dielectric medium having first and second surfaces lying opposite each other; a plurality of first discrete electrical conducting means disposed adjacent to said first surface, each of said conducting means having an outer surface lying away from said first surface; a plurality of second discrete electrical conducting means disposed adjacent to said second surface and each of which lies opposite a predetermined number of assigned different ones of said first discrete electrical conducting means; a plurality of pairs of electrode means each pair being assigned to a different one of said first electrical conducting means and each pair being disposed a selected distance from said outer surface of its assigned first electrical conducting means, each pair of electrode means having an initiating electrode and a steady state electrode; a plurality of first signal generating means each of which is coupled to a predetermined number of different ones of said steady state electrodes to selectively provide a first signal thereto; a plurality of second signal generating means each of which is coupled to a predetermined number of different ones of said initiating electrodes and said second preformed electrical conducting means to selectively provide a second signal to said initiating electrodes and a third signal to said second discrete electrical conducting means; said first signal and said third signal each having such polarity and such amplitude as to maintain an electrical discharge between any particular steady state electrode and its assigned first discrete electrical conducting means in response to having both said first signal and said third signal respectively simultaneously present at said particular steady state electrode and at the one of said second discrete electrical conducting means which lies opposite said last mentioned first discrete electrical conducting means; and said second signal having an amplitude and polarity such as to cause an electrical discharge between an initiating electrode and its associated steady state electrode in response to having both said first signal and said second signal respectively simultaneously present thereat.

10. An electrostatic data storage device comprising: a dielectric medium having first and second surfaces lying opposite each other; a plurality of first discrete electrical conducting means disposed adjacent to said first surface and arranged in rows and columns, each of said first conducting means having an outer surface lying away from said first surface; a plurality of electrodes each assigned to a different one of said first discrete electrical conducting means; a plurality of second discrete electrical conducting means disposed adjacent to said second surface, said second discrete electrical conducting means being adapted to provide common connecting means along column positions which correspond to said columns formed by said first discrete electrical conducting means; a plurality of pairs of first and second signal generating means with each pair thereof being coupled to a different row of said electrodes, a plurality of pairs of third and fourth signal generator means with each pair thereof being coupled to a different column common circuitry means; said first and third signals each having such polarity and such amplitude as to cause an electrical discharge to pass in a first direction between any particular electrode and its assigned first discrete electrical conducting means thereby providing an electrostatic charge between said last mentioned first discrete electrical conducting means and the one of said second discrete electrical conducting means lying in the column corresponding to the column of said last mentioned first discrete electrical conducting means; and said second and fourth signals each having such polarity and such amplitude as to cause an electrical discharge to pass in a second direction between any particular electrode and its assigned first discrete electrical conducting means if at the time said second and fourth signals are present, said last mentioned assigned first discrete electrical conducting means is holding a sufficient electrostatic charge.

References Cited in the file of this patent

UNITED STATES PATENTS

| | | |
|---|---|---|
| 2,717,373 | Anderson | Sept. 6, 1955 |
| 2,793,288 | Pulvari | May 21, 1957 |
| 2,884,617 | Pulvari | Apr. 28, 1959 |
| 2,918,655 | Pulvari | Dec. 22, 1959 |
| 2,955,281 | Brennenmann | Oct. 4, 1960 |